(12) United States Patent
Gaddam (10) Patent No.: US 11,481,152 B2
(45) Date of Patent: Oct. 25, 2022

(54) EXECUTION OF COMMANDS ADDRESSED TO A LOGICAL BLOCK

(71) Applicant: Micron Technology, Inc., Boise, ID (US)

(72) Inventor: Venkat R. Gaddam, Fremont, CA (US)

(73) Assignee: Micron Technology, Inc., Boise, ID (US)

(*) Notice: Subject to any disclaimer, the term of this patent is extended or adjusted under 35 U.S.C. 154(b) by 155 days.

(21) Appl. No.: 16/992,192

(22) Filed: Aug. 13, 2020

(65) Prior Publication Data

US 2021/0200472 A1 Jul. 1, 2021

Related U.S. Application Data

(60) Provisional application No. 62/954,866, filed on Dec. 30, 2019.

(51) Int. Cl.
*G06F 3/06* (2006.01)
(52) U.S. Cl.
CPC ............ *G06F 3/0659* (2013.01); *G06F 3/064* (2013.01); *G06F 3/0611* (2013.01); *G06F 3/0629* (2013.01); *G06F 3/0653* (2013.01); *G06F 3/0656* (2013.01); *G06F 3/0679* (2013.01)
(58) Field of Classification Search
CPC ...... G06F 3/061; G06F 3/0611; G06F 3/0619; G06F 3/0629; G06F 3/0638; G06F 3/064; G06F 3/0653; G06F 3/0656; G06F 3/0659; G06F 3/0679; G06F 3/068; G06F 3/0688
See application file for complete search history.

(56) References Cited

U.S. PATENT DOCUMENTS

| | | | |
|---|---|---|---|
| 9,122,401 B2 | 9/2015 | Zaltsman | |
| 9,454,310 B2 | 9/2016 | Tsai | |
| 10,019,161 B2 | 7/2018 | Sharifie | |
| 2018/0293006 A1* | 10/2018 | Jeong | G06F 3/0659 |
| 2020/0026464 A1* | 1/2020 | Yen | G06F 12/1009 |

* cited by examiner

*Primary Examiner* — Larry T MacKall
(74) *Attorney, Agent, or Firm* — Brooks, Cameron & Huebsch, PLLC (57) ABSTRACT

A controller of a memory sub-system can, responsive to providing a command completion signal to a host, mark a portion of a plurality of commands that are addressed to a same logical block of the memory devices, reorder the marked portion of the plurality of commands, wherein write commands from the marked portion of the plurality of commands are given priority over read commands from the marked portion of the plurality of commands, execute a newest write command from the marked portion of the plurality of commands prior to executing read commands, addressed to the same logical block, from the marked portion of the plurality of commands, and execute read commands from the marked portion of the plurality of commands in on an order in which the read commands were received and after the execution of the newest write command, wherein the read commands are executed responsive to an execution of the newest write command.

17 Claims, 4 Drawing Sheets

EXECUTION OF COMMANDS ADDRESSED TO A LOGICAL BLOCK

PRIORITY INFORMATION

This application claims priority to U.S. Provisional Application Ser. No. 62/954,866, filed Dec. 30, 2019, the contents of which are incorporated herein by reference.

TECHNICAL FIELD

Embodiments of the disclosure relate generally to memory sub-systems, and more specifically, relate to executing commands that overlap.

BACKGROUND

A memory sub-system can include one or more memory devices that store data. The memory devices can be, for example, non-volatile memory devices and/or volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to memory sub-systems that execute commands addressed to a same logical block. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information can be part of metadata for the host data.

The memory sub-system can receive access requests referred to as access commands. The memory sub-system can also receive different types of commands such as administrative commands. The memory sub-system can execute the commands. However, according to some conventional approaches, the memory sub-system can execute the commands out of order. Conventionally, the memory sub-system can execute a read command prior to executing a write command such that the read command can access outdated data.

Aspects of the present disclosure address the above and other deficiencies. To provide for the access of updated data, the memory sub-system can identify and execute commands that are addressed to the same logical blocks (LB). For example, the memory sub-system can identify and execute commands that read and/or write data to a same logical block. The memory sub-system can execute a write command prior to executing the read commands. The identifying and executing of the commands can be based on the completion of different commands addressed to the same LB. A newest write command can be executed prior to executing read commands. The read commands can also be executed in an order in which they were received by the memory sub-system.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
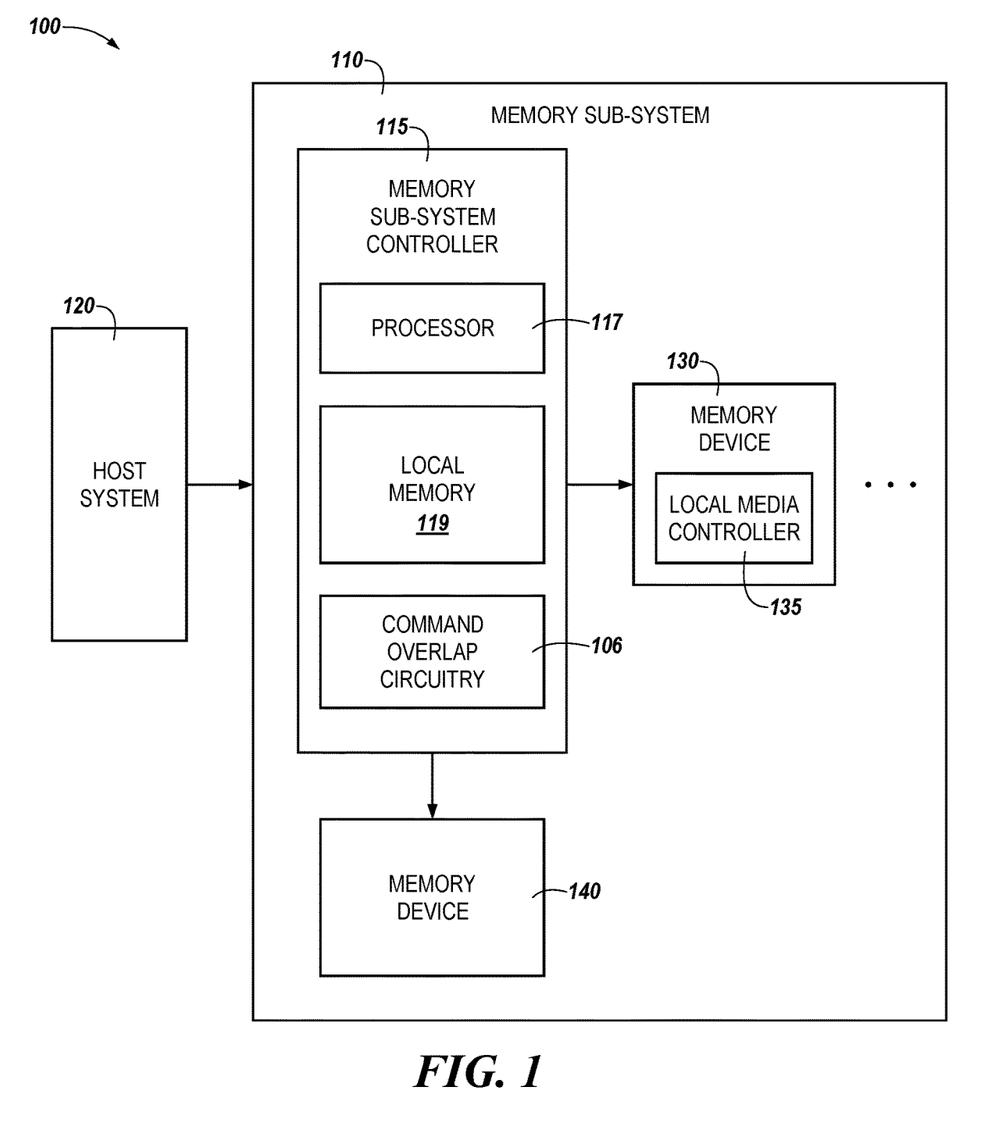
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates an example of a host system 120 coupled to one memory sub-system 110. As used herein, "coupled to" of "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to components (e.g., memory device 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices 130 and/or volatile memory devices 140. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130, 140 can be grouped as pages that can refer to a logical unit of the memory device used to store data. With some types of memory (e.g., NAND), pages can be grouped to form blocks.

Although non-volatile memory devices 130 such as a 3D cross-point array of non-volatile memory cells and NAND type memory (e.g., 2D NAND, 3D NAND) and 3D cross-point array of non-volatile memory cells are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code, for example. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations from the host system 120 and can convert the commands or operations into instructions or appropriate commands to achieve the desired access to the memory devices 130 and/or the memory devices 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include a local media controller 135 that operates in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 115 can also include command overlap circuitry 106. The command overlap circuitry 106 can identify commands, received by the memory sub-system 110, that are addressed to a same LB of the memory device 130 and/or the memory device 140, among other possible memory devices.

In some embodiments, the memory sub-system controller 115 includes at least a portion of the command overlap circuitry 106. For example, the memory sub-system controller 115 can include a processor 117 (processing device) configured to execute instructions stored in local memory 119 for performing the operations described herein. In some embodiments, the command overlap circuitry 106 is part of the host system 120, an application, or an operating system.

A command can comprise metadata. The command's metadata can include a namespace, a starting LB, and/or an ending LB, among other types of metadata. Commands can be described as overlapping if namespaces match and one of the LB from one command is between starting LB and ending LB of the other command. For example, a first command can overlap with a second command when the first command and the second command have a same staring LB and/or a same ending LB. In various examples, a first command and a second command can also overlap when at least a portion of the LB corresponding to each of the first command and the second command overlap. For example, the first command and the second command can overlap when a starting LB of the second command is greater than the starting LB of the first command but smaller than the ending LB of the first command. The first command and the second command can also overlap when the ending LB of the second command is greater than the starting LB of the first command but smaller than the ending LB of the first command. The first command and the second command can overlap when the starting LB of the second command is smaller than the starting LB of the first command and the ending LB of the second command is greater than the ending LB of the first command.

The namespace of a command can identify a type of command. For example, the namespace of a command can be a write or a read, among other types. The command's namespace can be used to determine which commands to provide to the processor 117 (e.g., processing device such as a central processing unit (CPU)) of the memory sub-system 110 for execution. For example, write commands can be provided to the processor 117 prior to providing read commands. For instance, a newest write command can be provided to the processor 117 prior to providing read commands. The newest write command can describe a last write command received.

The commands can be provided from the host system 120 to the memory sub-system controller 115 and to the command overlap circuitry 106. An order associated with the receipt of the commands can be retained. For example, a first command can be identified as being received prior to receiving a second command.

A command can be selected from the commands received by the memory sub-system 110. Upon selecting a command for execution, the received commands can be marked if the received commands are addressed to a same address to which the selected command is addressed. Marking a command can identify that the marked command and the selected command are addressed to a same address.

The commands can also be marked based on the completion of a command. A command can be completed when the command is executed. In some embodiments, upon command completion, a signal is provided to the host system 120 indicating the completion of the execution of said command.

Commands and/or an order associated with the commands can be stored in the command overlap circuitry 106 (e.g., command overlap circuitry 206 in FIG. 2), the local memory 119, the memory device 130, the memory device 140, and/or a different memory device such as cache and/or SRAM, among other possible types of memory. In various of examples, the command overlap circuitry 106 can utilize multiple data structures to store the commands received from the host system 120, signals received from the host system 120, and/or commands that overlap, among other types of data.

The marked commands can be executed, by the processor 117, prior to executing non-marked commands. Within the marked commands, the write commands can be executed prior to executing the read commands. Executing the write commands prior to executing the read commands allows for the read commands to access updated data.

Figure 2:
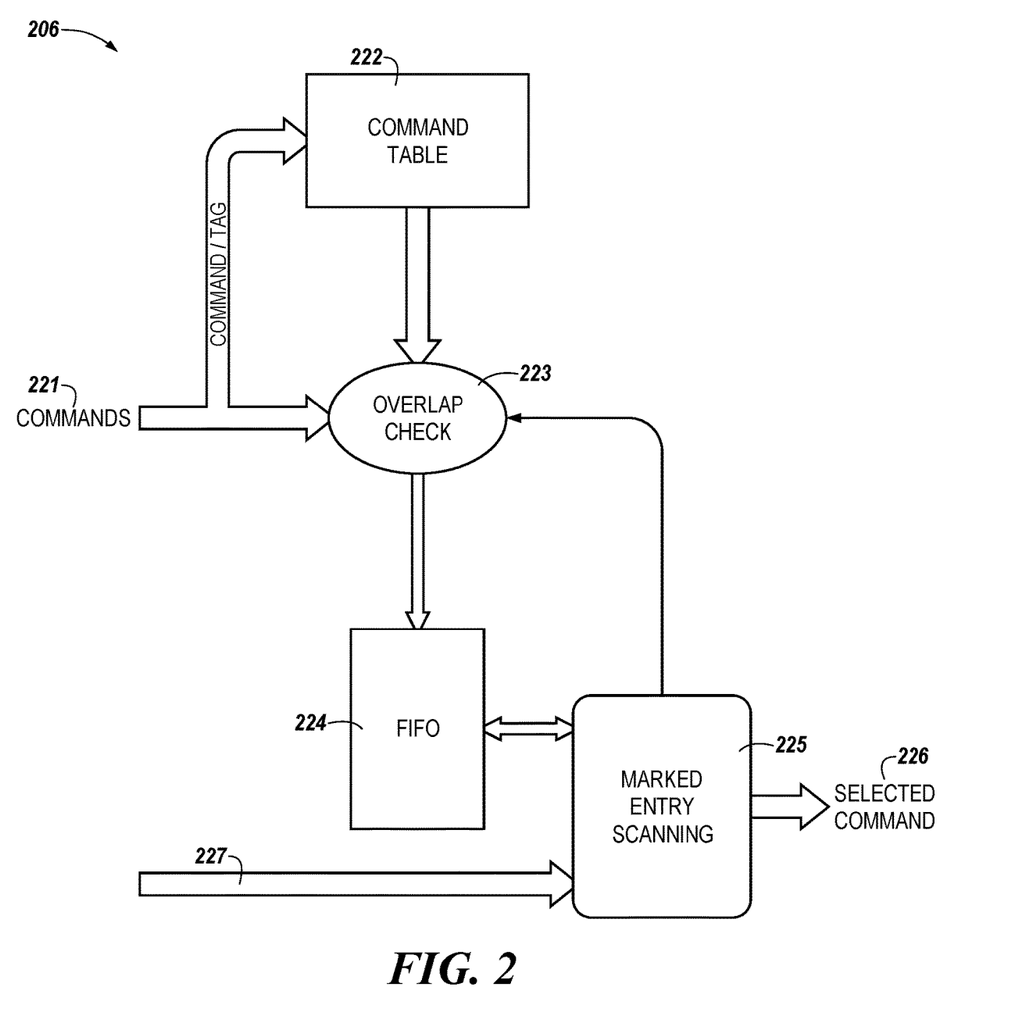
FIG. 2 illustrates an example of command overlap circuitry in accordance with some embodiments of the present disclosure.

FIG. 2 illustrates an example of command overlap circuitry 206 in accordance with some embodiments of the present disclosure. The command overlap circuitry 206 includes a command table 222, overlap check circuitry 223, first-in first-out (FIFO) memory 224, and marked entry scanning circuitry 225. The command table 222 and the FIFO memory 224 can be coupled to the overlap check circuitry 223. The marked entry scanning circuitry 225 can be coupled to the overlap check circuitry 223. The FIFO memory 224 can further be coupled to the marked entry scanning circuitry 225.

The command overlap circuitry 206 can receive commands 221 from a system host 120 of FIG. 1. In various examples, the commands 221 can be NVMe commands. The commands 221 can be added to the command table 222. The commands can also be provided to the overlap check circuitry 223.

The command table 222 can identify an order in which the commands 221 are received. The command table 222 can also store metadata of the commands 221. For example, the command table 222 can store a namespace, a starting LB, and/or an ending LB for each of the commands 221.

Each of the commands 221 can be assigned a tag. The tag can be composed from one or more of the namespace, the starting LB, and/or the ending LB, among other metadata values of the commands 221. The tag can be used to identify a command and as such can be referred to as a tag identification (ID). The tags can also be assigned to the commands 221 prior to the commands 221 being received by the command overlap circuitry 206. For example, the tags can be generated and assigned by the processor 117 in FIG. 1. Upon execution of the marked commands, the tag corresponding to the marked commands can be released such that the tag can be used to for different commands in the future.

The overlap check circuitry 223 can utilize the tags assigned to the commands 221 to identify which of the commands 221 are addressed to a same logical block (e.g., overlap). For example, commands 221 that overlap can have portions of the tags that are the same or can have a same tag. For instance, a first tag, represented by a first bit-vector, can be generated and assigned to a first command. A second tag, represented by a second bit-vector, can be generated and assigned to a second command. The first command and the second command can overlap when the first tag and the second tag have a same one or more bits having the same bit position within the first bit-vector and the second bit-vector. For example, the first tag and the second tag can have one or more bits that are the same, where the one or more bits represent a starting LB and/or an ending LB.

In various instances, the first command and the second command can be compared to determine whether they overlap without referencing tags assigned to the first command and the second command. For example, the starting LBs and ending LBs of the commands 221 can be compared to determine whether the commands overlap.

The overlap check circuitry 223 can identify an earliest command received and stored in the command table 222. Responsive to identifying the earliest command received, the overlap check circuitry 223 can compare the identified command to the other commands stored in the command table 222.

The overlap check circuitry 223 can mark the commands that overlap with the identified command. The overlap check circuitry 223 can also mark the identified command. The commands that overlap can be marked in the command table 222. For example, each entry in the command table 222 can correspond to a command and can include fields for a namespace, a starting LB, and ending LB, and/or a marked field, among other possible fields.

The overlap check circuitry 223 can store the marked commands in a FIFO memory 224. As used herein, marking commands can include identifying the commands. Commands can be marked by storing data in the command table 222 and/or the FIFO memory 224. For example, a flag (e.g., a bit) can be stored in the command table 222 and/or the FIFO memory 224 to mark a command. In various examples, the overlap check circuitry 223 can delete the marked commands from the command table 222 responsive to storing the marked command in the FIFO memory 224. In other instances, the overlap check circuitry 223 can delete the marked commands from the command table 222 responsive to the marked commands being executed (e.g., the marked commands being completed). Regardless of when the marked commands are deleted from the command table 222, the marked commands can be stored in the FIFO memory 224. In various examples, each of commands that are stored in the command table 222 will be marked given that an order in which the commands are received is retained in the command table 222 and provided that the commands are selected for marking based on that order.

The FIFO memory 224 can store commands and their associated metadata such that an order in which the stored commands are retrieved from the command table 222 is retained. For example, the earliest commands stored in the FIFO memory 224 can be the first commands retrieved from the FIFO memory 224.

The latest commands stored in the FIFO memory 224 can be the last commands retrieved from the FIFO memory 224. For instance, if a first command is stored in the FIFO memory 224 before a second command is stored in the FIFO memory 224, then the first command can be retrieved from the FIFO memory 224 prior to retrieval the second command from the FIFO memory 224.

In some examples, the order in which the marked commands are stored in the FIFO memory 224 can be separate from the order in which the marked commands are retrieved from the FIFO memory 224. For example, if a first command is stored in the FIFO memory 224 prior to storing a second command to the FIFO memory 224 and a third command is stored in the FIFO memory 224 after the first command and the second command are stored in the FIFO memory 224, then the first command can be retrieved from the FIFO memory 224 prior to retrieving the second and third commands and the third command can be retrieved prior to retrieving the second command.

In addition to marking the commands, the overlap check circuitry 223 can store the commands in the FIFO memory 224 such that the write commands are retrieved from the FIFO memory 224 prior to the retrieval of the read commands. The marked entry scanning circuitry 225 can retrieve commands from the FIFO memory 224. Retrieving the write command from the FIFO memory 224 prior to retrieving the read command from the FIFO memory 224 allows for the execution of the write commands prior to the execution of the read commands. Executing the write commands prior to executing the read commands provides for the reading of up-to-date data. For example, if the first command stored in the FIFO memory 224 is a write command, the second command stored in the FIFO memory 224 is a read command, and the third command stored in the FIFO memory 224 is also a write command, then the third command can be retrieved from the FIFO memory 224 prior to retrieving the second command but after retrieving the first command. As such, the first and third commands can be retrieved from the FIFO memory 224 prior to retrieval of the second command responsive to the first and third commands being write commands and the second command being a read command. In various examples, a first order in which first commands are sorted to the FIFO memory 224 can selected based on the commands (e.g., first commands) that are stored in the command table 222. However, once the first commands are stored in the FIFO memory 224 additional commands can be received by the command overlap circuitry 206. The additional commands can be stored in the FIFO memory 224. The marked entry scanning circuitry 225 can retrieve commands based on a second order that is selected based on the availability of the first commands and the additional commands. The second order may be different than the first order given that the first order may not include the additional commands.

Once the commands have been marked and stored in the FIFO memory 224, the marked entry scanning circuitry 225 can access the marked commands stored in the FIFO memory 224 and can retrieve a first marked command. The marked entry scanning circuitry 225 can cause the first marked command to be deleted responsive to retrieving the first marked command or can cause the first marked command to be deleted responsive to completing the execution of the first marked command.

The marked entry scanning circuitry 225 can verify that the commands stored in the FIFO memory 224 are marked. Verifying that the commands stored in the FIFO memory 224 are marked can be described as scanning. The marked entry scanning circuitry 225 can scan the marked commands stored in the FIFO memory 224 to ensure that they overlap or can cause the overlap check circuitry 223 to scan the commands stored in the command table 222 to identify the commands that overlap. If no additional commands are stored in the FIFO memory 224, the marked entry scanning circuitry 225 can request that the overlap check circuitry 223 mark additional commands and store the newly marked commands to the FIFO memory 224. In various examples, the overlap check circuitry 223 can mark additional command and store the newly marked commands to the FIFO memory 224 without additional inputs from the marked entry scanning circuitry 225. For example, the overlap check circuitry 223 can mark commands regardless of whether there are commands stored in the FIFO memory 224 or not.

The commands 226 retrieved by the marked entry scanning circuitry 225 from the FIFO memory 224 can be provided to the processor 117 (e.g., memory sub-system CPU) in FIG. 1. The marked entry scanning circuitry 225 can provide a single command 226 to the processor at a time. The overlap check circuitry 223 can refrain from storing additional commands from the command table 222 to the FIFO memory 224 until the processor executes the command provided by the marked entry scanning circuitry 225. In various examples, the overlap check circuitry 223 can store additional commands from the command table 222 to the FIFO memory 224 without waiting for a processor to execute the command provided by the marked entry scanning circuitry 225.

The processor can provide a command completion signal 227 to the marked entry scanning circuitry 225 after the command is executed by the processor. Responsive to receipt of the command completion signal 227, the marked entry scanning circuitry 225 can scan the commands stored by the FIFO memory 224 to determine whether the commands are marked. The marked entry scanning circuitry 225 can compare the executed command (e.g., completed command) and the marked commands stored by the FIFO memory 224 to determine whether they overlap. If they overlap, then the marked entry scanning circuitry 225 can select a next marked command and can provided the selected command 226 to the processor of the memory sub-system.

The marked entry scanning circuitry 225 can continue to provide commands 226 responsive to receipt of the command completion signals 227. Responsive to determining that the FIFO memory 224 does not store marked commands, the marked entry scanning circuitry 225 can provide signals to the overlap check circuitry 223 to cause the overlap check circuitry 223 to mark additional commands. In various examples, the overlap check circuitry 223 can store commands to the FIFO memory 224 without being prompted by the marked entry scanning circuitry 225.

Responsive to receipt of the signals from the marked entry scanning circuitry 225, the overlap check circuitry 223 can select an earliest received signal from the command table 222. Responsive to selecting the earliest received command from the command table 222, the overlap check circuitry 223 can mark the commands that overlap with the selected earliest received command. The overlap check circuitry 223 can then store the marked commands to the FIFO memory 224.

The marked entry scanning circuitry 225 can provide the commands stored in the FIFO memory 224 as previously described. Once there are no more commands in the FIFO memory 224 and responsive to receipt of a command completion signal 227, the marked entry scanning circuitry 225 can continue to cause overlapping commands to be marked by the overlap check circuitry 223.

At any point new commands 221 can be received by the command overlap circuitry 206. For instance, a new command 221 can be received once the command table 222 has been populated and/or the FIFO memory 224 has been populated with received command and/or marked commands, respectively.

The newly received command 221 can be provided to the overlap check circuitry 223. The overlap check circuitry 223 can determine whether a command that is currently being executed overlaps with the newly received command 221 or if the marked commands stored in the FIFO memory 224 overlap with the newly received command 221. If the newly received command 221 and the latest executed command overlap, then the overlap check circuitry 223 can add the newly received command 221 to the FIFO memory 224. As used herein, a latest executed command can include a command that was executed lastly as oppose to a command that was executed prior to the execution of the lastly executed command. The newly received command 221 can be added to the FIFO 224 such that the newly received command 221 is retrieved after the marked write commands if the newly received command 221 is a write command or after the marked read commands if the newly received command 221 is a read command. Marked commands can continue to be retrieved from the FIFO memory 224 as previously described.

The newly received command 221 can be assigned a tag. The overlap check circuitry 223 can determine whether to add the newly received command 221 to the FIFO memory 224 based on the assigned tag. In some instances, the newly received command 221 can be added to the command table 222 and to the FIFO memory 224.

Once marked commands that are assigned the same tag are completed, the tag corresponding to the marked commands can be released. Releasing the tag describes the availability of the tag for use with different commands and/or LBs. The marked entry scanning circuitry 225 can release the tag or a different device can release the tag such as the overlap check circuitry 223 and/or a processing device of the memory sub-system that includes the command overlap circuitry 106.

Figure 3:
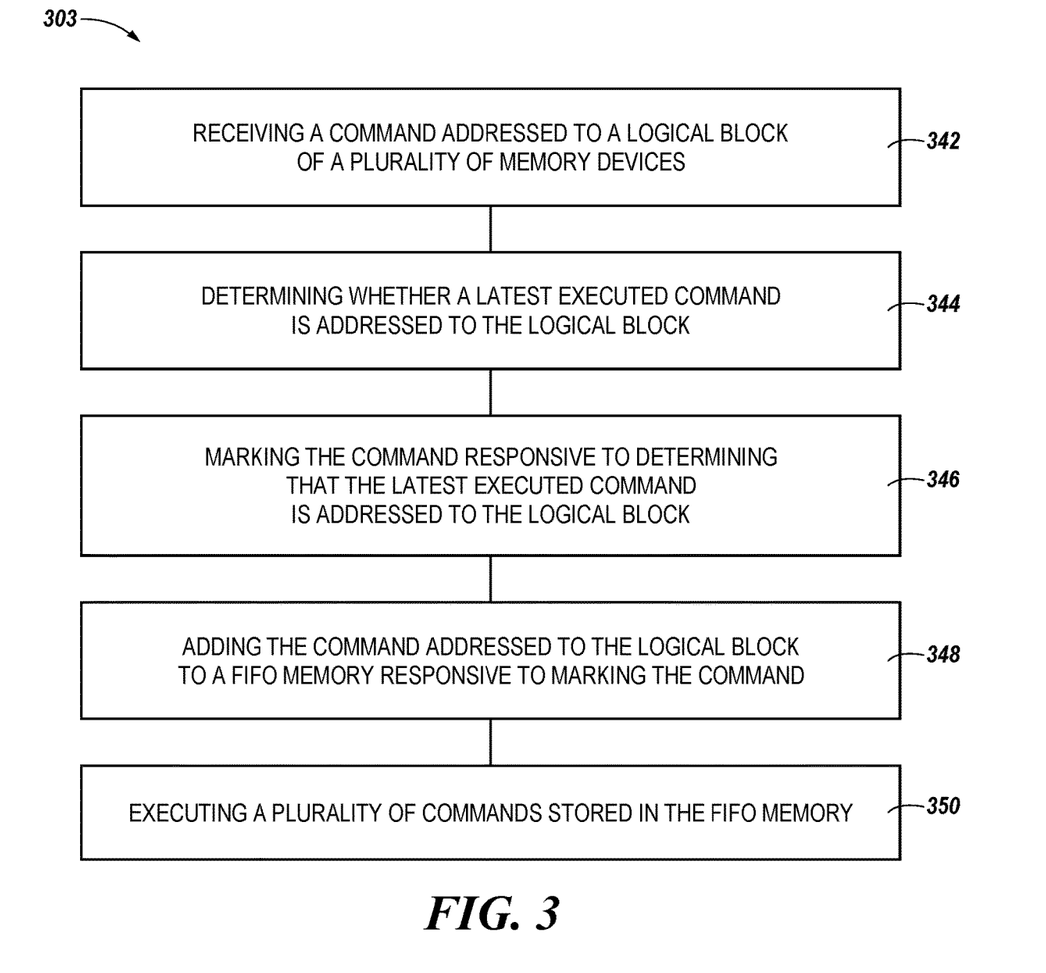
FIG. 3 is a flow diagram of an example method for command overlap circuitry in accordance with some embodiments of the present disclosure.

FIG. 3 is a flow diagram of an example method for command overlap circuitry in accordance with some embodiments of the present disclosures. The method 303 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 303 is performed by the command overlap circuitry 206 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 342, a command addressed to a logical block of a plurality of memory devices can be received. At block 344, a determination can be made as to whether a latest executed command is addressed to the logical block. At block 346, the command can be marked responsive to determining that the latest executed command is addressed to the logical block. At block 348, the command addressed to the logical block can be added to a FIFO memory responsive to marking the command. At block 350, a plurality of commands stored in the FIFO memory can be executed.

In various examples, the command can be added to the command table responsive to refraining from marking the command. Responsive to refraining from marking the command, the method 303 can refrain from the adding the command to the FIFO memory.

The command can be determined to be a write command. Responsive to determining that the command is a write command and responsive to marking the command, the command can be added to the FIFO memory such that the command is executed before read commands and after a newest write command from the write commands of the plurality of commands.

The command can be determined to be a read command. Responsive to determining that the command is a read command and responsive to marking the command, the command can be added to the FIFO memory such that the command is executed after the read command and the write commands of the plurality of commands. In various instances, commands can be executed by providing the commands to the processing device of a memory sub-system.

Figure 4:
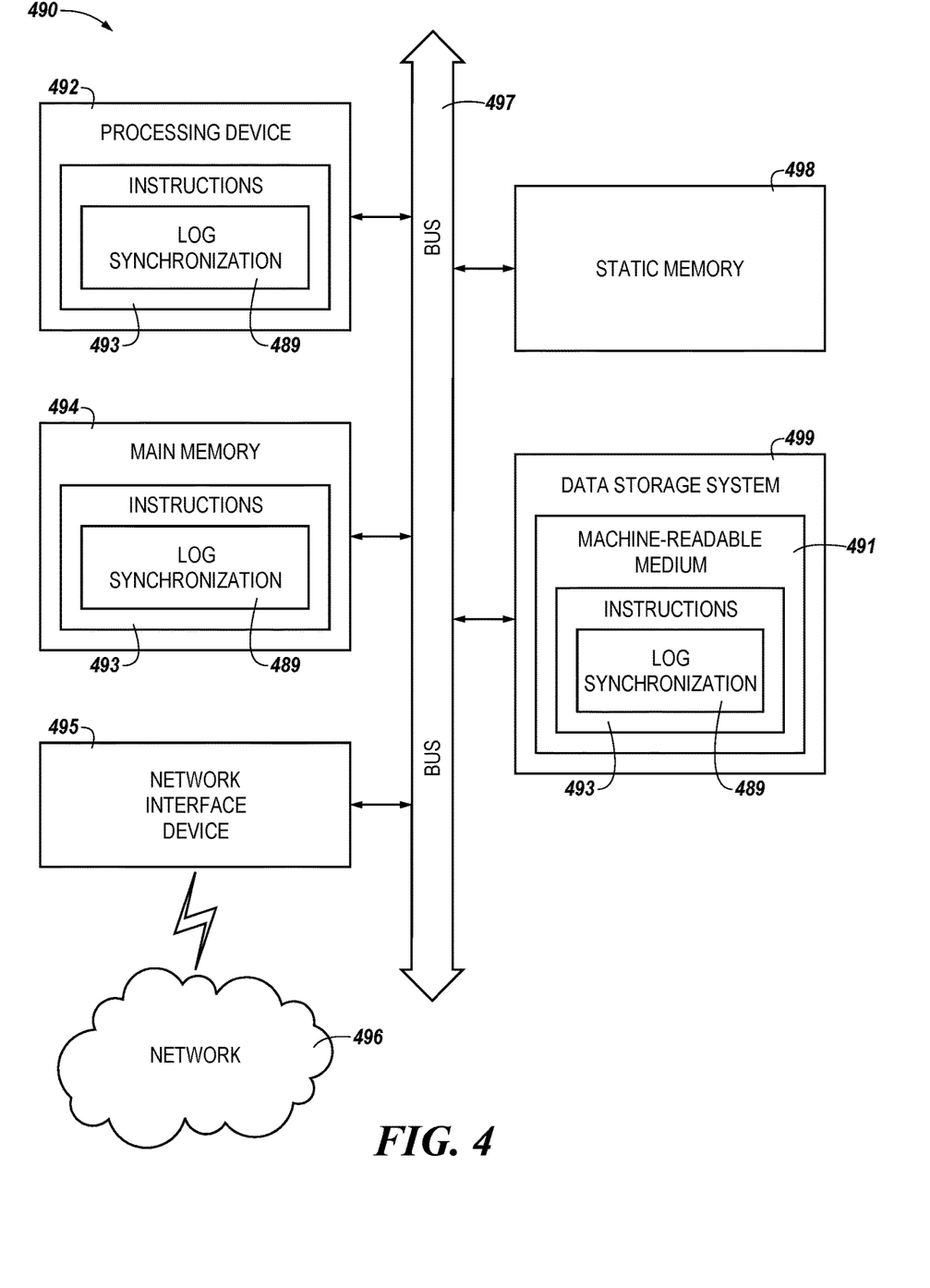
FIG. 4 is a block diagram of an example computer system in which embodiments of the present disclosure may operate.

FIG. 4 illustrates an example machine of a computer system 490 within which a set of instructions, for causing the machine to perform one or more of the methodologies discussed herein, can be executed. In some embodiments, the computer system 490 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command overlap circuitry 106 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 490 includes a processing device 492, a main memory 494 (e.g., read-only memory (ROM), flash memory, dynamic random access memory (DRAM) such as synchronous DRAM (SDRAM) or Rambus DRAM (RDRAM), etc.), a static memory 498 (e.g., flash memory, static random access memory (SRAM), etc.), and a data storage system 499, which communicate with each other via a bus 497.

The processing device 492 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 492 can also be one or more special-purpose processing devices such as an application specific integrated circuit (ASIC), a field programmable gate array (FPGA), a digital signal processor (DSP), network processor, or the like. The processing device 492 is configured to execute instructions 493 for performing the operations and steps discussed herein. The computer system 490 can further include a network interface device 495 to communicate over the network 496.

The data storage system 499 can include a machine-readable storage medium 491 (also known as a computer-readable medium) on which is stored one or more sets of instructions 493 or software embodying one or more of the methodologies or functions described herein. The instructions 493 can also reside, completely or at least partially, within the main memory 494 and/or within the processing device 492 during execution thereof by the computer system 490, the main memory 494 and the processing device 492 also constituting machine-readable storage media. The machine-readable storage medium 491, data storage system 499, and/or main memory 494 can correspond to the memory sub-system 110 of FIG. 1.

In one embodiment, the instructions 493 include instructions to implement functionality corresponding to the command overlap circuitry 106 of FIG. 1. The instructions can include a command instruction 489 associated with executing overlapping commands (such as command overlap circuitry 106 in FIG. 1). While the machine-readable storage medium 491 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory;
   a host interface; and
   a processor, coupled with the memory and the host interface, to:
   responsive to providing a command completion signal to a host, mark a portion of a plurality of commands that are addressed to a same logical block of the memory;
   execute a newest write command from the marked portion of the plurality of commands prior to executing read commands, addressed to the same logical block, from the marked portion of the plurality of commands; and
   execute read commands from the marked portion of the plurality of commands in an order in which the read commands were received and after the execution of the newest write command, wherein the read commands are executed responsive to an execution of the newest write command.

2. The system of claim 1, further comprising:
   a command table; and
   wherein the processor is configured to store the plurality of commands in the command table as the plurality of commands are received.

3. The system of claim 2, wherein the processor further comprises overlap check circuitry configured to mark the portion of the plurality of commands responsive to completion of a different command addressed to the logical block, wherein the portion of the plurality of commands are marked in the command table.

4. The system of claim 1, wherein the processor further comprises overlap check circuitry configured to mark the portion of the plurality of commands responsive to completion of a different command addressed to a different logical block.

5. The system of claim 4, wherein the overlap check circuitry is configured to select a next command to be executed from the plurality of commands responsive to completion of the different command addressed to the different logical block and not the logical block, wherein the next command is an earliest command received by the system.

6. The system of claim 4, wherein the overlap check circuitry is configured to mark a latest command received by the system responsive to the latest command received being addressed to the logical block.

7. The system of claim 1, further comprising a first-in first-out (FIFO) memory configured to store the marked portion of the plurality of commands.

8. The system of claim 7, wherein the FIFO memory is further configured to store write commands from the marked portion of the plurality of commands prior to storing read commands from the marked portion of the plurality of commands.

9. The system of claim 8, wherein the FIFO memory is further configured to store the write commands in an order in which the write commands were received by the system.

10. The system of claim 8, wherein the FIFO memory is further configured to store the read commands in an order in which the read commands were received by the system.

11. A method comprising:
    receiving a write command addressed to a logical block of a plurality of memory devices;
    determining that a latest executed command is addressed to the logical block;
    responsive to determining that the latest executed command is addressed to the logical block, marking the write command;
    adding the write command addressed to the logical block to a first-input first-output (FIFO) memory responsive to marking the command; and
    executing a plurality of commands stored in the FIFO memory, wherein the plurality of commands comprise the write command and read commands, wherein the read commands are executed after the write commands, and wherein the read commands are executed responsive to an execution of the write command.

12. The method of claim 11, further comprising, responsive to determining that the write command is a write command and responsive to marking the command, adding the write command to the FIFO memory such that the write command is executed before the read commands and wherein the write command is a newest write command.

13. The method of claim 11, wherein executing the plurality of commands stored in the FIFO memory further comprises providing the plurality of commands to a processor of a memory sub-system.

14. A system, comprising:
    a processor;
    a memory;
    a controller, coupled with the memory and the processor, to:
        intercept a first command completion signal identifying a completion of a first command addressed to a first logical block of the memory;
        responsive to the intercepting the first command completion signal, determine that pending commands are to different logical blocks of the memory other than the first logical block;
        identify a second command, addressed to a second logical block of the memory, to be executed;
        mark commands from the pending commands addressed to the second logical block; and
        provide the marked commands to the processor by:
            providing, for execution, a newest write command from the marked commands; and
            providing, for execution, read commands from the marked commands, in an order in which the read commands where received.

15. The system of claim 14, wherein the controller is further configured to provide the read commands responsive to providing the newest write command to the processor.

16. The system of claim 14, wherein the controller is further configured to provide, to the processing device, a newest write command from a plurality of write commands wherein the newest write command is a last received write command.

17. The system of claim 16, wherein the controller is further configured to:
    receive a second command completion signal responsive to the processing device executing the newest write command; and
    provide a read command responsive to receiving the second command completion signal.

* * * * *